United States Patent [19]
Cattau et al.

[11] Patent Number: 5,839,745
[45] Date of Patent: Nov. 24, 1998

[54] LOCK MECHANISM FOR FIFTH WHEEL HITCH

[76] Inventors: Lyle L. Cattau, 2900 "O" Plz., Omaha, Nebr. 68107; Fred P. Smith, 228 S. Scenic Dr., Alpine, Utah 84004; Larry D. Larcom, 1625 "A" W. 980 S., Orem, Utah 84058

[21] Appl. No.: 688,734

[22] Filed: Jul. 31, 1996

[51] Int. Cl.$^6$ .......................... B62D 53/10; B62D 53/12
[52] U.S. Cl. .................. 280/434; 280/438.1; 280/510
[58] Field of Search ................... 280/433, 432, 280/434, 435, 505, 506, 508, 510, 438.1

[56] References Cited

U.S. PATENT DOCUMENTS

| | | | |
|---|---|---|---|
| 2,471,854 | 5/1949 | Bies et al. | 280/433 |
| 2,590,962 | 4/1952 | Gurton | 280/433 |
| 2,811,374 | 10/1957 | Fuschi | 280/433 |
| 2,985,463 | 5/1961 | Geerds | 280/407 |
| 3,275,340 | 9/1966 | Sancioni | 280/433 |
| 3,565,459 | 2/1971 | Reid | 280/510 |
| 4,960,288 | 10/1990 | Chambers | 280/423.1 |

FOREIGN PATENT DOCUMENTS 727261  6/1932  France ................................. 280/434

*Primary Examiner*—Anne Marie Boehler
*Attorney, Agent, or Firm*—Zarley, McKee, Thomte, Voorhees & Sease

[57] ABSTRACT

The lock mechanism for a fifth wheel hitch of the present invention includes a housing mounted on a pedestal, the housing having a hitch plate mounted on the upper end thereof. The hitch plate slot, for receiving a trailer pin, is mounted over a channel extending forwardly in the housing, such that the trailer pin will extend downwardly into the channel and slide along the channel bottom and between the channel side walls. A hook member is pivotally mounted on the housing and selectively projects through an opening in one side wall of the channel such that a hook arm retains the trailer pin in position in the channel. A handle mounted on the hook member to manually move the hook member between the engaged and disengaged positions. A lock plate is pivotally mounted to the housing and includes a throat with a first catch for retaining the handle in the disengaged position, and a second catch for retaining the handle in the engaged position.

4 Claims, 6 Drawing Sheets

LOCK MECHANISM FOR FIFTH WHEEL HITCH

TECHNICAL FIELD

The present invention relates generally to fifth wheel hitches, and more particularly to an improved lock mechanism for a fifth wheel hitch.

BACKGROUND OF THE INVENTION

Fifth wheel hitches are provided for connecting the tractors of semi-trailer truck combinations to the trailer. Such hitches are also becoming common on smaller vehicles, including pickup trucks and the like. In both cases, one common problem suffered by all fifth wheel hitches is in the ability of the driver to visually check to ensure that the trailer is locked in position on the tractor.

In addition, conventional lock mechanisms for fifth wheel hitches are relatively complicated structures with many moving parts, thereby increasing the need for maintenance and repair.

SUMMARY OF THE INVENTION

It is therefore a general object of the present invention to provide an improved lock mechanism for fifth wheel hitches.

Still a further object of the present invention is to provide a locking mechanism for fifth wheel hitches which is economical to manufacture, simple to install, and easy to use.

These and other objects of the present invention will be apparent to those skilled in the art.

The lock mechanism for a fifth wheel hitch of the present invention includes a housing mounted on a pedestal, the housing having a hitch plate mounted on the upper end thereof. The hitch plate slot, for receiving a trailer pin, is mounted over a channel extending forwardly in the housing, such that the trailer pin will extend downwardly into the channel and slide along the channel bottom and between the channel side walls. A hook member is pivotally mounted on the housing and selectively projects through an opening in one side wall of the channel such that a hook arm retains the trailer pin in position in the channel. A handle mounted on the hook member to manually move the hook member between the engaged and disengaged positions. A lock plate is pivotally mounted to the housing and includes a throat with a first catch for retaining the handle in the disengaged position, and a second catch for retaining the handle in the engaged position.

DESCRIPTION OF THE PREFERRED EMBODIMENT

Figure 1:
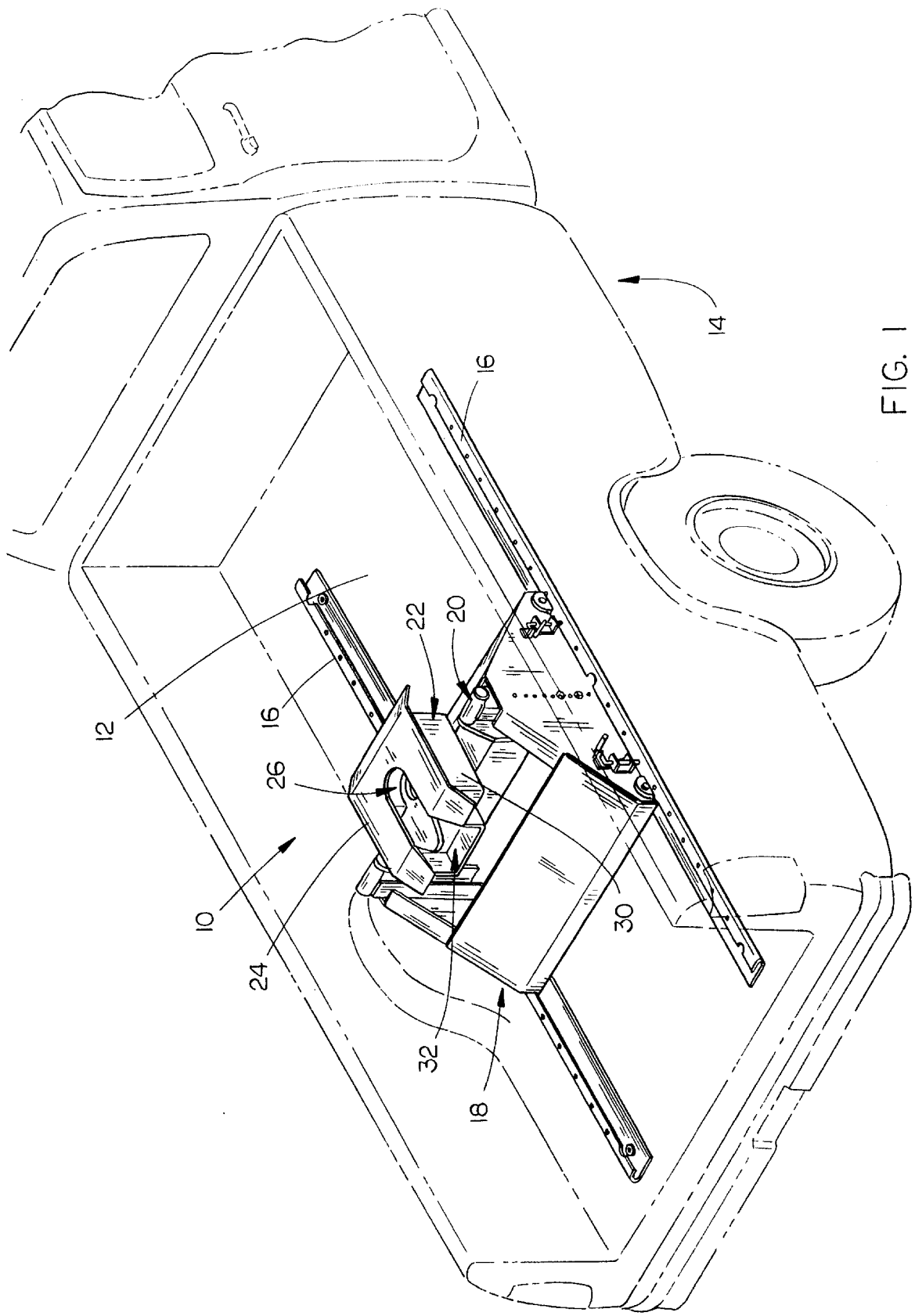
FIG. 1 is a perspective view of the fifth wheel hitch with the lock mechanism of the present invention installed in a pick-up bed.

Referring now to the drawings, in which similar or corresponding parts are identified with the same reference numeral, and more particularly to FIG. 1, a sliding hitch is identified generally at 10 and is shown mounted on the bed 12 of a pick-up truck 14.

Fifth wheel hitch 10 includes a pair of rails or runners 16 which are mounted parallel to one another and extend forwardly and rearwardly on bed 12. A pedestal 18 is operably mounted on runners 16 for selective movement on rollers, forwardly and rearwardly along runners 16. Pedestal 18 supports a rocker arm assembly 20, which in turn supports a hook assembly 22 having a hitch plate 24 affixed to the top thereof.

Figure 4:
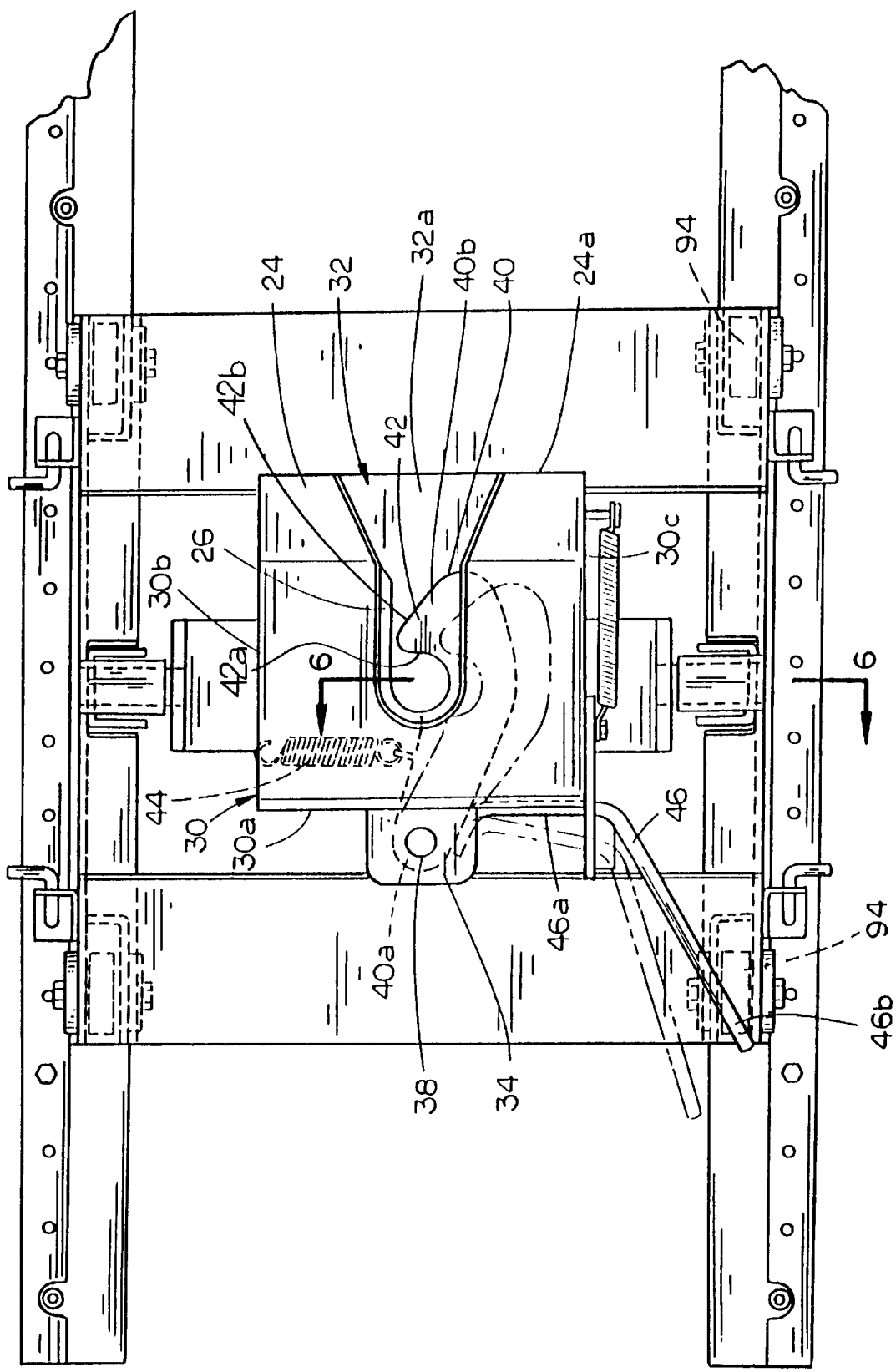
FIG. 4 is a plan view of the hitch.

Referring now to FIG. 4, hitch plate 24 has a slot 26 formed therein which extends forwardly from a rearward edge 24a of the hitch plate, and generally centrally in the hitch plate, to receive the hitch pin 28 (shown in FIG. 5) of a trailer therein. As shown in FIG. 1, hook assembly 22 includes a housing 30 which supports hitch plate 24 on rocker arm assembly 20. Slot 26 in hitch plate 24 extends downwardly into housing 30 to form a forwardly extending channel 32 having a bottom 32a, for receiving hitch pin 28 (shown in FIG. 5).

Figure 3:
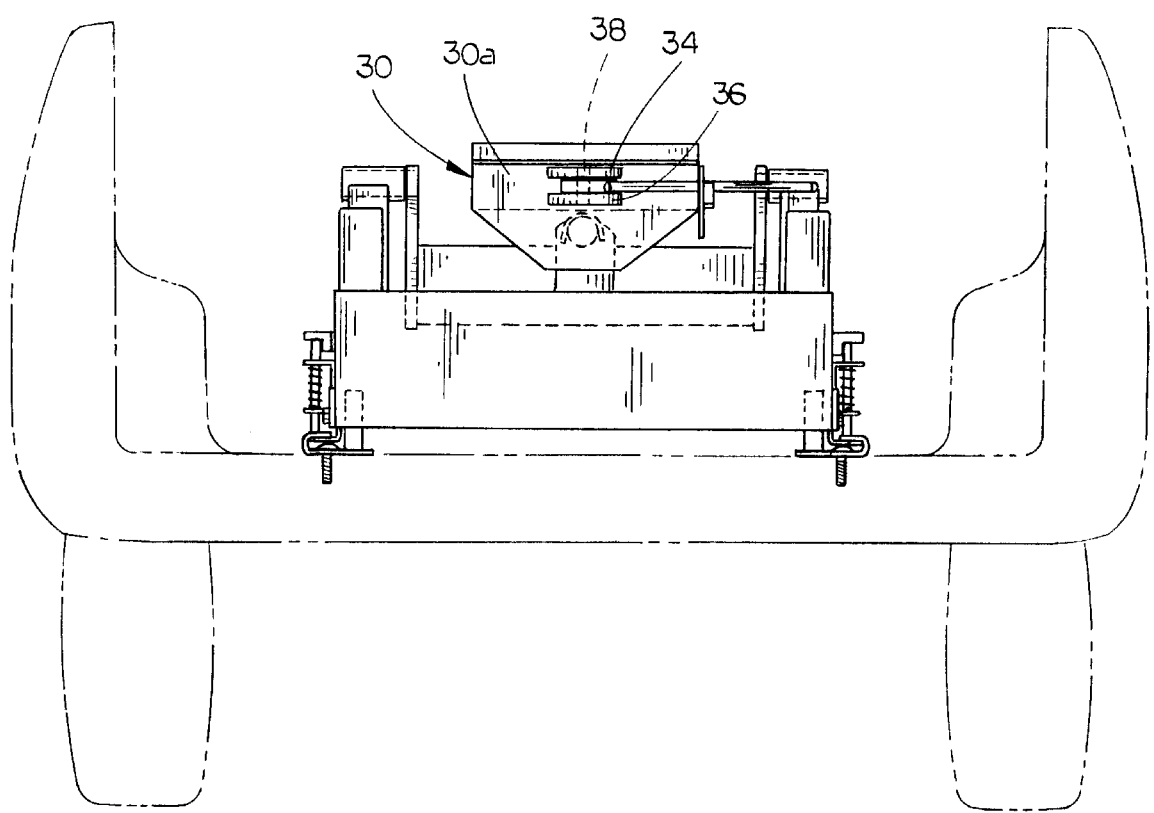
FIG. 3 is an elevational view taken from the forward side of the hitch.

Referring now to FIG. 3, a pair of upper and lower plates 34 and 36 project forwardly from a vertical forward wall 30a of housing 30. Plates 34 and 36 are parallel to one another and have a vertically oriented pin 38 extending therebetween, to form a vertical pivotal axis. As shown in FIG. 4, a hook 40 has a forward pivotal end 40a pivotally connected to pivot pin 38, such that hook 40 will pivot in a horizontal plane about the vertical axis of pivot pin 38. Hook 40 extends rearwardly from pivot pin 38 through an opening in housing forward wall 30a so as to be positioned within housing 30 spaced above channel bottom 32a and below hitch plate 24 with a hook arm 42 formed on the rearward end 40b of hook 40 for selectively retaining hitch pin 28 (shown in FIG. 5) within channel 32. A spring 44 is connected between hook 40 and a first vertical side wall 30b so as to apply a predetermined biasing force urging hook 40 into an "engaged" position with hook arm 42 maintaining a hitch pin within channel 32 (as shown in solid lines in FIG. 4).

A handle 46 is affixed to hook 40 and extends transversely outwardly from hook 40 adjacent housing forward wall 30a, in a generally horizontal plane. Handle 46 includes an inward portion 46a which extends from hook 40 adjacent forward wall 30a and projects slightly beyond housing second side wall 30c. An outward portion 46b of handle 46 is bent to project forwardly from the outward end of inward portion 46a. Handle 46 thereby permits manual movement of hook 40 from the solid line "engaged" position to the broken line "disengaged" position, shown in FIG. 4, by pivoting hook 40 on pin 38.

Figure 5A:
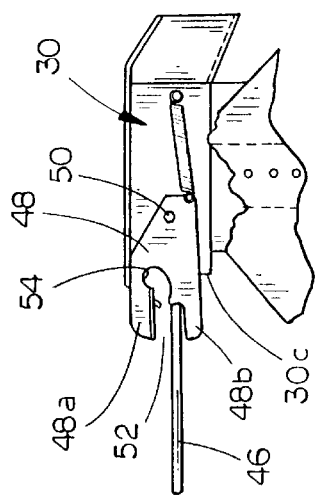
FIG. 5A is an elevational view similar to FIG. 5, showing the lock mechanism in the unlocked position.
Figure 5:
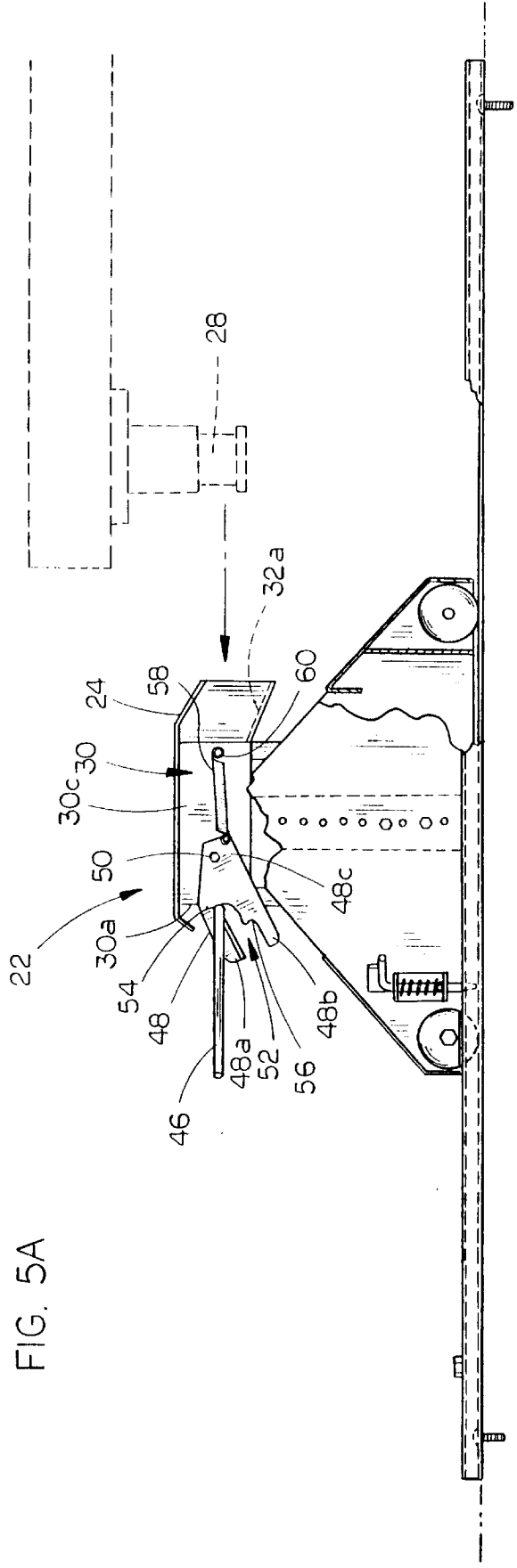
FIG. 5 is an elevational view of the hitch taken from the right side of FIG. 3.

Referring now to FIGS. 5 and 5A, a handle lock plate 48 is pivotally mounted on a bolt 50 to housing side wall 30c, with a pair of forwardly projecting upper and lower legs 48a and 48b projecting forwardly beyond the forward side 30a of housing 30. A throat 52 is formed between projecting legs 48a and 48b, through which the inward portion of handle 46 is journaled and retained in the engaged and disengaged positions. A hook-shaped catch 54 is formed in throat 52 on upper leg 48a, which will hold handle 46 in the engaged position, and prevent forward movement of handle 46 to the "disengaged" position. A second hook-shaped catch 56 is formed in throat 52 on lower leg 48b, which will retain handle 46 in the "disengaged" position and prevent rearward movement of handle 46 towards the "engaged" position. A spring 58 is connected to a rearward end 48c of lock plate 48 and a fixed bolt 60, to bias lock plate 48 and apply a force which urges the lock plate downwardly towards the "engaged" position. In this way, spring 58 provides additional force to retain handle 46 in the engaged position within catch 54 of lock plate 48. FIG. 5 shows lock plate 48 in the "engaged" position, while FIG. 5A shows lock plate 48 and handle 46 in the "disengaged" position.

Referring once again to FIG. 4, it can be seen that hook arm 42 projects slightly into channel 32 when in the broken line "disengaged" position. Hook arm 42 has a forward surface 42a curved to receive and hold a king pin of a trailer in the locked position, and a rearward surface 42b formed at an angle relative to forward surface 42a. Rearward surface 42b is formed at an angle such that forward movement of a king pin within channel 32 will cause hook arm 42 to be outwardly, out of channel 32, thereby pivoting handle 46 forwardly slightly beyond the "disengaged" position shown in broken lines in FIG. 4 and in solid lines in FIG. 5a.

In operation, this combination of lock plate 48 biased by spring 58 and the configuration of hook 40 and handle 46 serve to provide an "automatic" locking feature. To lock the king pin 28 of a trailer in position on hitch 10, handle 46 is pulled forwardly and lock plate 48 is pivoted upwardly such that handle 46 engages the second hook shaped catch 56 of the "disengaged" position. Hitch 10 may then be moved rearwardly (by moving the truck supporting the hitch rearwardly) such that king pin 28 moves forwardly into channel 32 and into contact with hook arm rearward surface 42b. As hitch 10 continues to move rearwardly, hook arm 42 is forced outwardly from channel 32, thereby pivoting handle 46 forwardly out of second hook shaped catch 56. Spring 58 pivots lock plate 48 once handle 46 is removed from catch 56, such that movement of hook arm 42 back into channel 32 (as the king pin reaches the forward end of channel 32) handle 46 will engage the first hook shaped catch 54 to lock the king pin in position. In this way, a trailer may be "automatically" locked in position on hitch 10.

Figure 2:
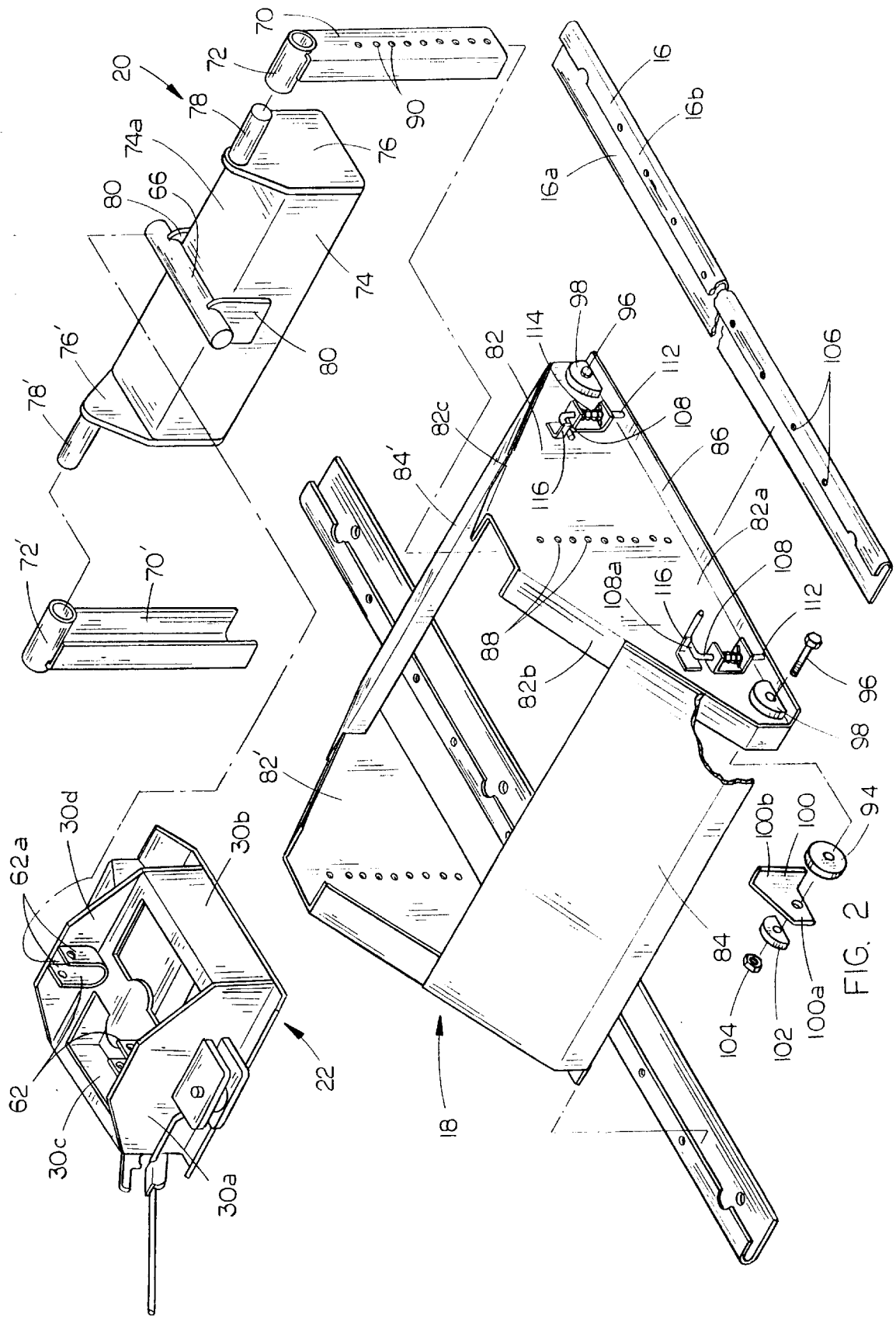
FIG. 2 is an exploded perspective view of the fifth wheel hitch.
Figure 6:
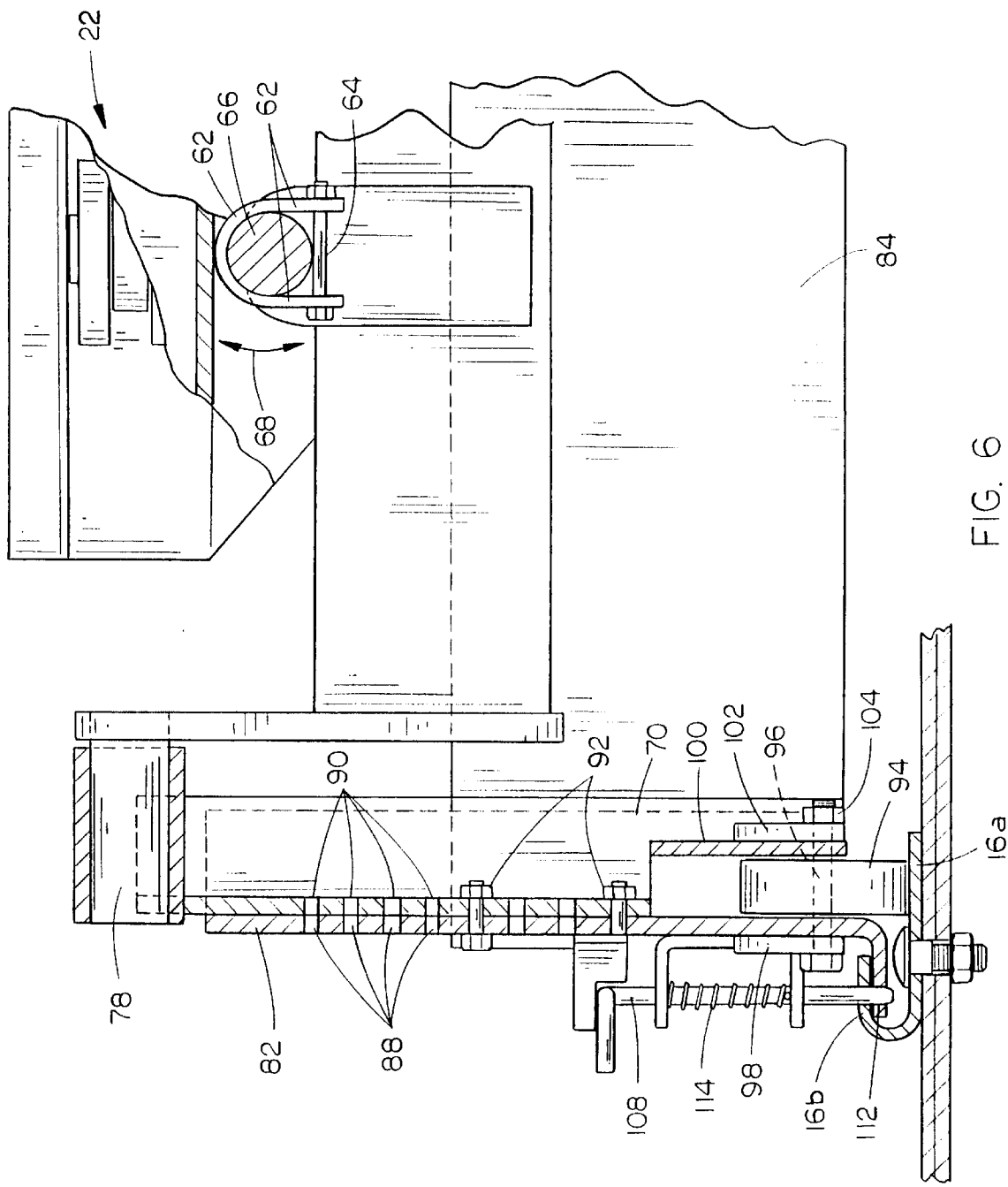
FIG. 6 is a sectional view taken at lines 6—6 in FIG. 4.

Referring now to FIG. 2, the bottom of hook assembly 22 is shown in more detail. Forward and rearward walls 30a and 30d project downwardly beyond side walls 30b and 30c, each end wall 30a and 30d having a generally U-shaped bracket 62 affixed thereto. The legs 62a of each bracket 62 have apertures therethrough which are coaxial to receive a retainer bolt 64 therethrough, as shown in FIG. 6. Brackets 62 are affixed to inward surfaces of forward and rearward end walls 30a and 30d with their legs directed downwardly, and are aligned so as to receive a cylindrical pivot bar 66 from the rocker arm assembly 20, therein. Thus, hook assembly 22 is pivotable about the longitudinal axis of pivot bar 66, as shown by arrow 68 in FIG. 6. Retainer bolt 64 prevents hook assembly 22 from being removed from pivot bar 66 while permitting pivotal movement thereon.

Referring once again to FIG. 2, rocker arm assembly 20 will support hook assembly 22 and permit pivotal movement about a transverse horizontal axis. Rocker arm assembly 20 includes a pair of spaced apart vertically oriented stanchions 70 and 70', each having a sleeve 72 and 72' affixed to the upper ends thereof. Stanchions 70 and 70' are connected to pedestal 18 (as described in more detail hereinbelow) with sleeves 72 and 72' oriented coaxially. An elongated beam 74 has upwardly projecting end plates 76 and 76' mounted on the longitudinal ends thereof. End plates 76 and 76' extend upwardly beyond an upper surface 74a of beam 74. Pivot rods 78 and 78' are mounted on end plates 76 and 76' respectively, and project outwardly therefrom coaxially. As shown in FIG. 2, pivot rods 78 and 78' are mounted on end plates 76 and 76' near the upper ends thereof such that beam 74 will swing below the axis of pivot rods 78 and 78'. Pivot rods 78 and 78' are journaled into sleeves 72 and 72' to permit this swinging or rocking motion between stanchions 70 and 70'.

Pivot bar 66 is mounted orthogonal and spaced below the pivotal axes of pivot rods 78 and 78', and spaced above the upper surface 74a of beam 74. A pair of support plates 80 are mounted on forward and rearward side walls of beam 74, with an arcuate notch in the upper ends thereof to receive and support pivot bar 66.

Pedestal 18 includes a pair of generally triangular side plates 82 and 82' which are affixed in vertical generally parallel positions by forward and rearward cross-members 84 and 84'. Because side plates 82 and 82' are identical in construction, only side plate 82 will be described herein in detail.

Side plate 82 has an outwardly projecting flange 86 projecting continuously along the base edge 82a thereof. Flange 86 is slidably received within runner 16, as described in more detail hereinbelow. A plurality of apertures 88 are formed in a vertical line centered between the upper edges 82b and 82c of side plate 82. Apertures 88 correspond with apertures 90 formed in a vertical line along the height of stanchion 70, such that bolts 92 (as shown in FIG. 6) may be selectively journaled through pairs of apertures 88 and 90 to secure stanchion 70 in one of a variety of vertical positions on side plate 82. In this way, the height of the transverse pivotal axis of pivot rods 78 and 78' may be adjusted vertically as desired.

Referring now to FIGS. 2, 4 and 6, a pair of wheels 94 are rotatably mounted to the inward face of side plate 82 at the forward end rearward apizes thereof. A bolt 96 serves as an axle for each wheel 94 and is threaded through a semicircular outer hub 98, thence through side plate 82, through wheel 94, through a leg 100a of a spacer bracket 100, and thence through an inward hub 102. A nut 104 retains the bolt in position. Spacer bracket 100 has a transverse leg 100b and a longitudinal leg 100a which form an enclosure when mounted on side plate 82 and cross members 84, so as to surround the majority of the upper portion of wheel 94 and protect it from the elements.

Each runner 16 has a generally J-shaped cross-section, with a flat back 16a and a short leg 16b projecting over the top of and parallel to back 16a. A series of holes 106 are formed in leg 16b and are aligned along the length of runner 16, to receive the lower end of set pins 108 operably connected to side plate 82. As shown in FIGS. 2 and 6, a pair of set pins 108 are vertically slidably journaled through support brackets 110 mounted on side plate 82. Flange 86 of side plate 82 has a pair of openings 112 aligned with the lower end of set pins 108 to selectively receive the lower end of the set pins. A spring 114 has one end attached to each set pin 108 and oriented so as to be compressed when set pin 108 is moved upwardly out of engagement with openings 112 in flange 86 (as shown in FIGS. 2 and 6).

The upper ends of set pins 108 are bent orthogonal to the vertical portion, to present an arm 108a which may be selectively retained over a projecting tab 116 mounted on side plate 82. In this way, tab 116 will retain set pin 108 in an upwardly disposed position out of engagement with apertures 106 of runner 16, while springs 114 will urge pins 108 into engagement with apertures 106 and openings 112 of flange 86, thereby securing pedestal 18 in a selected position on runners 16. As shown in FIG. 6, the back 16a of runner 16 extends a distance to provide a support path for wheels 94 thereon.

Whereas the invention has been shown and described in connection with the preferred embodiment thereof, many modifications, substitutions and additions may be made which are within the intended broad scope of the appended claims.

What is claimed is:

1. In combination:
   a fifth wheel hitch including a pedestal supporting a housing with a hitch plate affixed to the top thereof;
   the hitch plate including a forwardly extending slot formed in a rearward edge thereof for receiving a depending pin of a trailer;
   the housing including a forwardly extending channel therein aligned with the slot in the hitch plate to receive the trailer pin projecting through the hitch plate slot;
   said channel including a bottom, opposing side walls, and a forward end wall; and
   hook means operably mounted on said housing for selectively engaging a pin within the channel and preventing rearward movement of the pin from the channel, said hook means being operable between engaged and disengaged positions;
   said hook means including an opening in one of said channel side walls, extending generally parallel to the channel bottom, for receiving the hook member therethrough;
   said hook means further including a hook member pivotally mounted on said housing for movement between an engaged position with a hook arm projecting through said channel opening and into the channel to retain a trailer pin between the channel forward end wall and the hook arm, and a disengaged position with the hook arm pivoted outwardly from the engaged position;
   a handle having a first end affixed to the hook means for movement therewith, and a second end projecting freely from the hook means, for moving the hook means between the engaged and disengaged positions;
   biasing means connected between the hook member and the housing to urge the hook member towards the engaged position;
   a lock plate pivotally mounted to the housing for movement between first and second positions;
   said lock plate including a forward edge having a rearwardly extending throat formed between upper and lower legs;
   a first catch formed in the throat for selectively retaining the handle pivoted in the disengaged position;
   a second catch formed in the throat for selectively retaining the handle pivoted in the engaged position;
   said lock plate pivotally mounted for selective movement between the first position with the first catch engaged with said handle and a second position with the second catch engaged with the handle.

2. The combination of claim 1, wherein said hook member includes a forward surface and a rearward surface, the rearward surface oriented at an acute angle relative to the forward surface, and wherein said hook arm projects slightly into the housing channel in the disengaged position, such that movement of a trailer pin forwardly from a rearward end of the channel to a forward end of the channel will contact the hook member rearward surface and pivot the hook member outwardly of the channel.

3. The combination of claim 1, further comprising biasing means connected between the lock plate and the housing for urging the lock plate towards the second position.

4. In combination:
   a fifth wheel hitch including a pedestal supporting a housing with a hitch plate affixed to the top thereof;
   the hitch plate including a forwardly extending slot formed in a rearward edge thereof for receiving a depending pin of a trailer;
   the housing including a forwardly extending channel therein aligned with the slot in the hitch plate to receive the trailer pin projecting through the hitch plate slot;
   said channel including a bottom, opposing side walls, and a forward end wall; and
   hook means operably mounted on said housing for selectively engaging a pin within the channel and preventing rearward movement of the pin from the channel, said hook means being operable between engaged and disengaged positions;
   said hook means including an opening in one of said channel side walls, extending generally parallel to the channel bottom, for receiving the hook member therethrough;
   said hook means further including a hook member pivotally mounted on said housing for movement between an engaged position with a hook arm projecting through said channel opening and into the channel to retain a trailer pin between the channel forward end wall and the hook arm, and a disengaged position with the hook arm pivoted outwardly from the engaged position;
   a handle having a first end affixed to the hook means for movement therewith, and a second end projecting freely from the hook means, for moving the hook means between the engaged and disengaged positions;
   a lock plate pivotally mounted to the housing for movement between first and second positions;
   said lock plate including a forward edge having a rearwardly extending throat formed between upper and lower legs;
   a first catch formed in the throat for selectively retaining the handle pivoted in the disengaged position;
   a second catch formed in the throat for selectively retaining the handle pivoted in the engaged position;
   said lock plate pivotally mounted for selective movement between the first position with the first catch engaged with said handle and a second position with the second catch engaged with the handle.

* * * * *